Patented Dec. 16, 1952

2,621,768

UNITED STATES PATENT OFFICE 2,621,768

FLEXIBLE PLATE CLUTCH OR BRAKE

Harland W. Cardwell and Earl R. Johnson, Wichita, Kans., assignors to Cardwell Manufacturing Company, Inc., Wichita, Kans.

Application March 10, 1948, Serial No. 14,135

16 Claims. (Cl. 192—88)

This invention relates to clutches and brakes, and more particularly to friction clutches and brakes operated by fluid pressure, preferably air under pressure.

The invention further relates to annular, metallic or non-metallic flexible friction elements or discs suitable for use in either clutches or brakes, and adapted to be mounted side by side with a diaphragm arranged therebetween so as to provide a pressure chamber for fluid effective to flex the friction discs apart.

The invention still further relates to preferred forms of clutch and brake structure embodying the above flexible friction elements or discs, the friction elements employed being provided, if desired, with passages for effecting cooling thereof by water or any other suitable liquid medium.

The principal object of the invention is to provide a clutch and/or brake construction in which the friction elements or discs associated with the shaft for transmitting and/or absorbing driving torque are flexible or elastic enough to bend and allow the outer portions thereof to be flexed apart in an axial direction into engagement with cooperating driving or driven plates, upon the application of fluid pressure thereto, and which friction elements or discs have sufficient resilience or elasticity to return to their initial disengaged position upon release of said pressure.

Another object of the invention is to provide a structure in which the friction discs or elements are provided with coolant passages in the engaging face thereof to simultaneously effect cooling of said friction elements or discs while at the same time effecting direct cooling of the friction surfaces engaged by said discs.

Another object of the invention is to provide a multi-disc water-cooled brake in which the coolant is distributed for effective circulation between the sets of friction discs and across all of the friction surfaces in direct contact with said discs to effect maximum cooling thereof.

Other objects and features of the invention will be apparent from the following description taken in conjunction with the accompanying drawings, in which.

Figure 4:
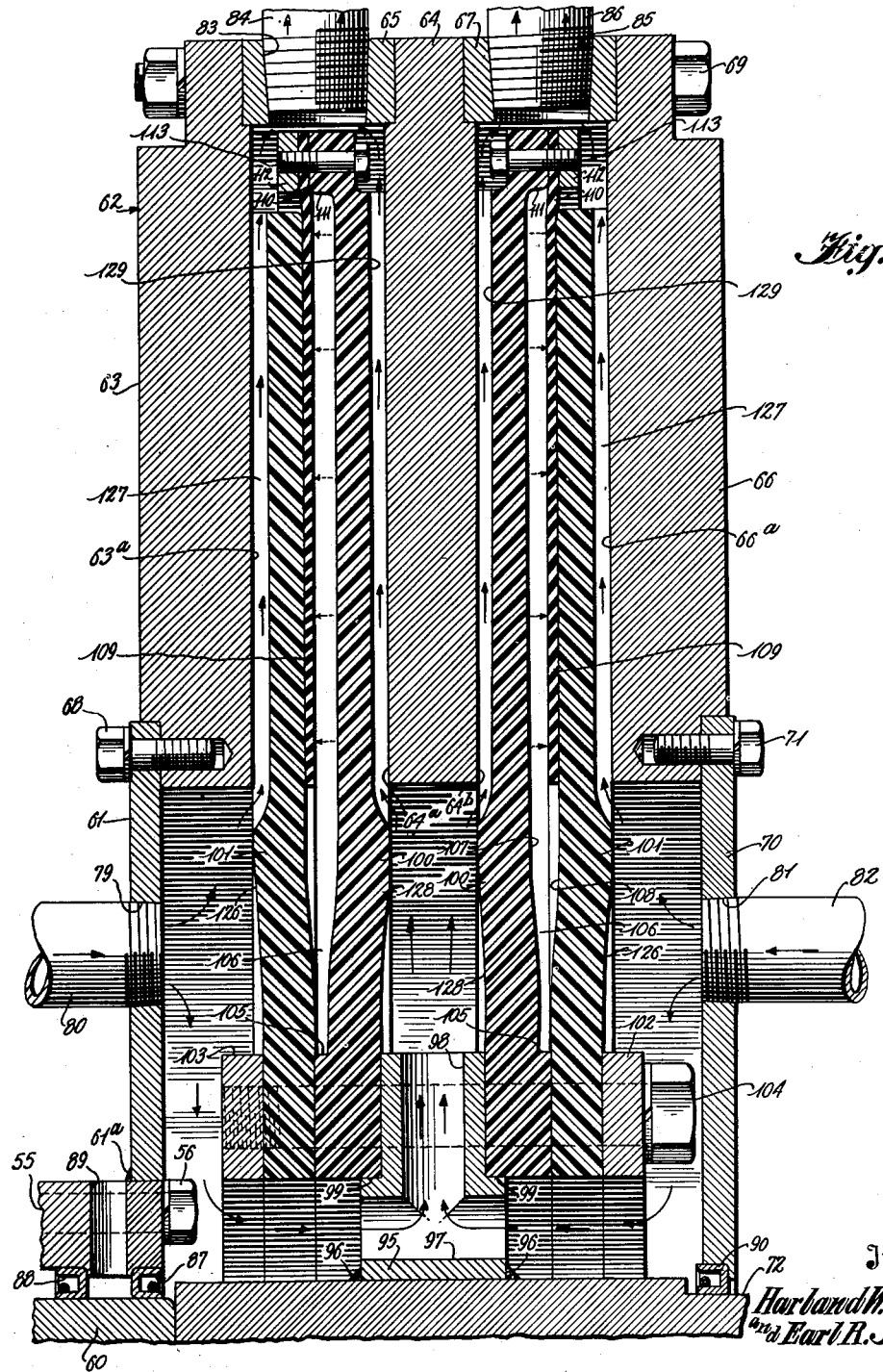
Figure 5:
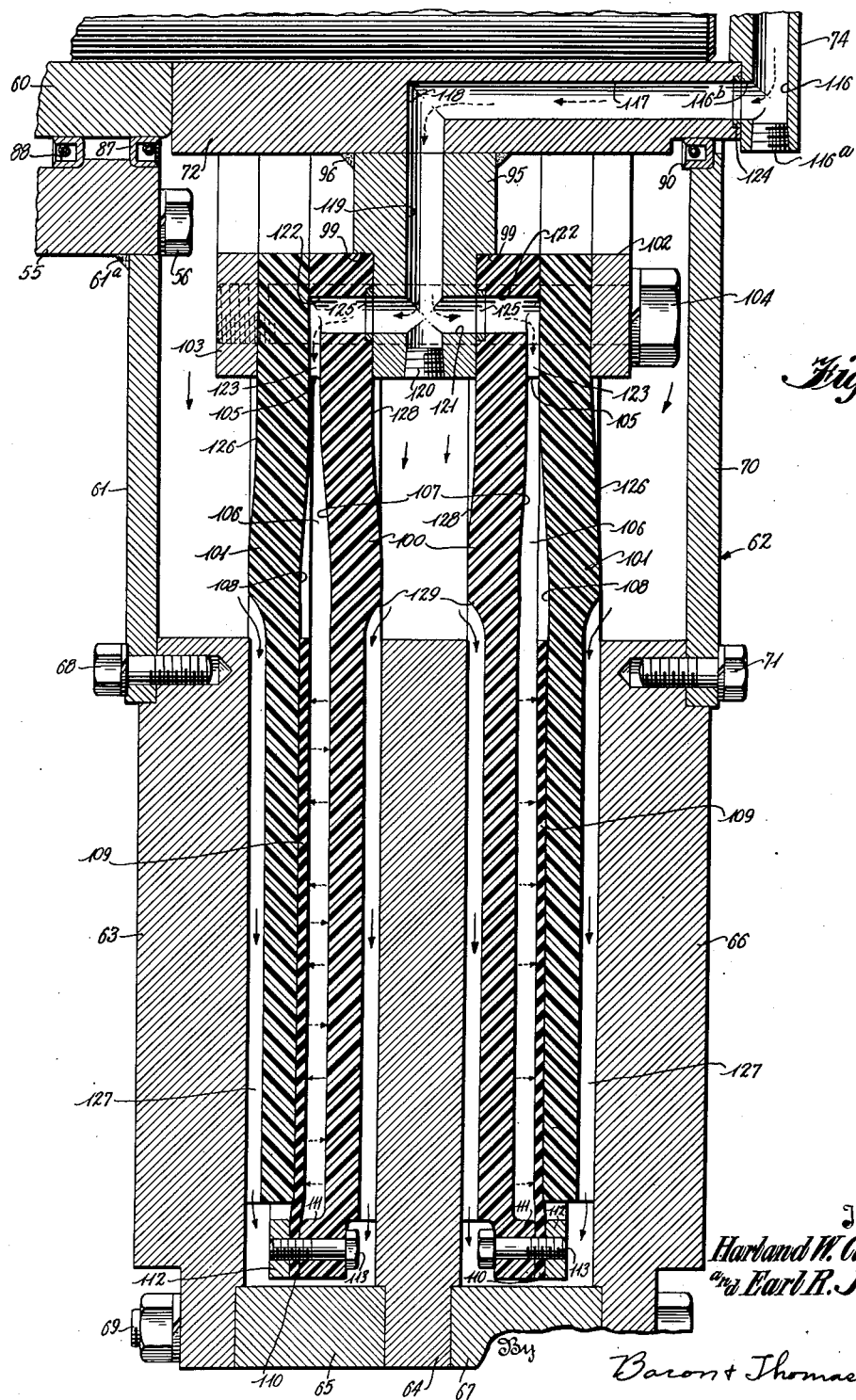

Fig. 4 is an enlarged sectional view, diagrammatic in some respects, and intended to primarily illustrate the circulation of the coolant through the brake, the flexible friction elements being illustrated in their flexed or engaged positions; and Fig. 5 is a similar diagrammatic sectional view particularly illustrating the manner in which air under pressure is conducted to the pressure chambers between each pair of friction discs to flex or bend the discs into their flush engaged positions.

Figure 1:
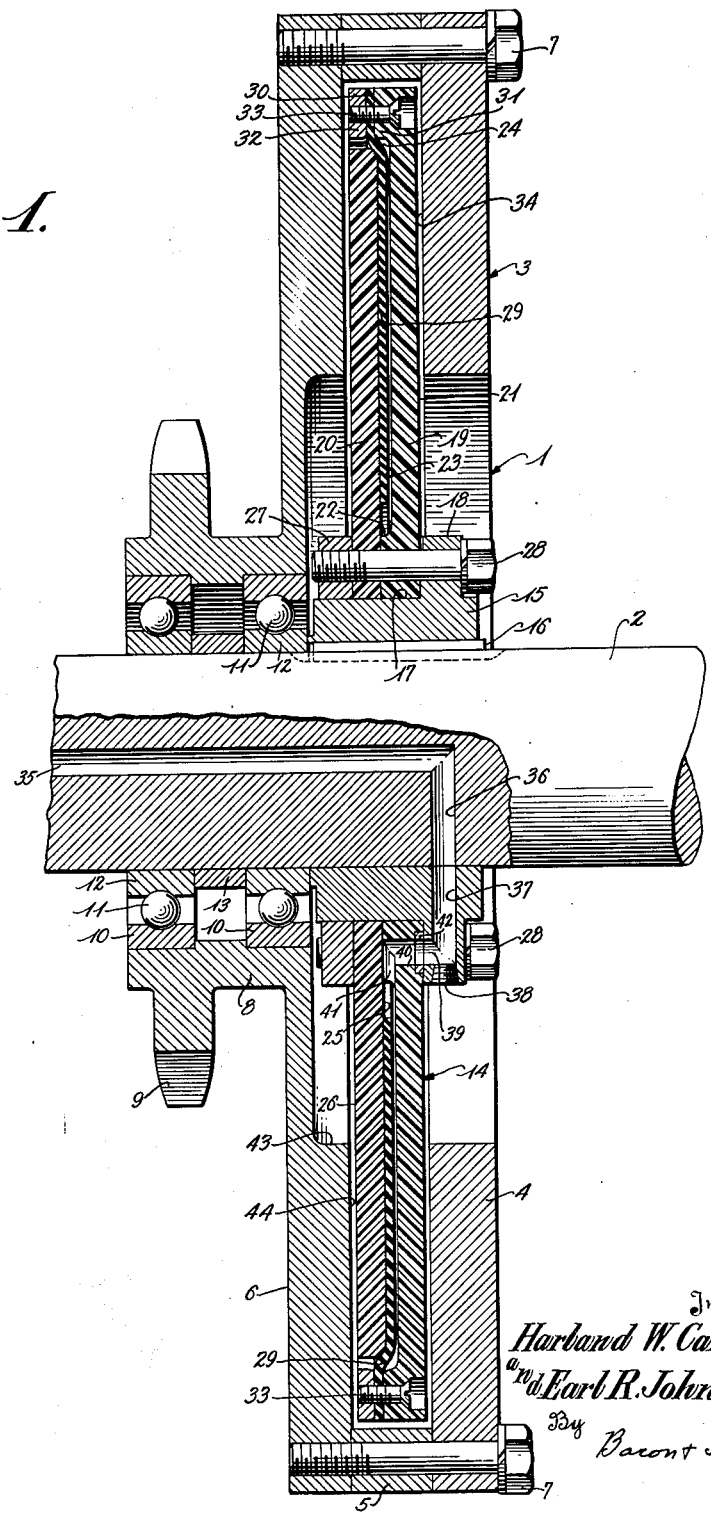
Fig. 1 is a longitudinal sectional view through a structure embodying the flexible friction elements or discs of the present invention, the structure being adapted to be used either as a clutch or brake, and the friction discs being shown in their unflexed or disengaged position.

Referring now to Fig. 1, the clutch or brake structure illustrated therein is generally identified by the numeral 1 and is shown in association with a shaft 2. The shaft 2 may be either a drive shaft or a driven shaft, or may be held stationary, depending upon the purpose which the structure is intended to serve. The clutch or brake 1 includes a housing 3 embodying an annular end plate 4, a spacer ring 5, and a second end plate 6, the plates 4 and 6 and the spacer ring 5 being secured together in assembled relation by a series of cap screws 7. The plate 6 has a central hub portion 8 carrying a sprocket 9. The central hub portion 8 is suitably bored to receive the outer races 10 of a pair of ball bearings 11, the inner races 12 of said bearings being mounted upon the shaft 2 and being separated by a spacer 13. When the shaft 2 is utilized as a drive shaft, then the sprocket 9, of course, will be driven. The sprocket 9 will serve as a driver when the shaft 2 is employed as a driven shaft. On the other hand, when the shaft 2 is held stationary, it will oppose relative rotation of the housing 3 and sprocket 9.

A driving connection is established between the shaft 2 and the housing 3 through a clutch plate assembly 14, including a mounting member 15 secured in non-rotatable relation to the shaft 2 by a conventional key 16. The mounting member 15 has an outer cylindrical portion 17 extending along the length thereof from one end and terminating at the base of an outwardly extending flange 18. A pair of flexible, flat, annular friction elements or discs 19 and 20 is snugly fitted upon the cylindrical portion 17 of the mounting member 15. The friction elements 19 and 20 are made of molded asbestos-phenolic friction material, or any other suitable non-metallic or metallic flexible friction material. The outer side 21 of the friction element 19 abuts the adjacent face of the flange 18 and the inner marginal portion of said friction element is thickened by an annular boss 22 having a radial dimension substantially equal to that of the flange 18, whereby to space the major area of the inner face 23 of the friction element 19 from the friction element 20 to provide a chamber 24 between said friction elements adapted to receive operating fluid under pressure, as will be explained more fully hereinafter. The inner face 25 of the friction element 20 engages the adjacent face of the boss 22 and the other or outer side 26 of said friction element is engaged by a clamping ring 27, which also fits snugly on the mounting member 15. A plurality of cap screws 28 extend through suitable openings in the flange 18 of the mounting member 15, through aligned openings in the friction elements or discs 19 and 20, and are threaded into openings in the clamping ring 27 for clamping the inner margins of the friction elements together and for securely mounting said friction elements upon the mounting member 15.

A normally flat annular, fabric-reinforced rubber diaphragm 29 is disposed in the chamber 24 and one side thereof is cemented or otherwise suitably adhesively bonded to the inner face 25 of the friction element 20 throughout their annular area of contact. In this connection, it will be noted that the inner marginal edge of the diaphragm 29 is close to the boss 22 so that the diaphragm 29 covers almost the entire inner face 25 of the friction element 20. The friction element 19 is larger in outer diameter than the friction element 20, but is of substantially the same diameter as the outer diameter of the diaphragm 29, so that a marginal portion 30 of the diaphragm 29 projects beyond the periphery of the friction element 20 and into confronting relation with an annular ridge or flange 31 at the margin of the friction element 19. The marginal portion 30 of the diaphragm 29 is securely clamped to the flange 31 of the friction element 19 by a clamping ring 32 and a plurality of countersunk screws 33, the heads of the screws 33 being disposed a substantial distance inwardly from the outer side 21 of the friction element 19 so as to provide for great wear of the friction element 19 before the heads of the screws 33 can possibly come in contact with the friction face 34 of the annular plate 4.

The shaft 2 has an axial passageway 35 which communicates at one end with an air supply conduit (not shown) and at its other end with a radial passage 36. The mounting member 15 has a passageway 37 which communicates at one end with the passage 36 and is closed at its opposite end by a conventional plug 38. A lateral passageway 39 in the mounting member 15 communicates with a passageway 40 in the boss 23 of the friction element 19, and said boss in turn is provided with a radial groove 41 affording communication with the pressure chamber 24. Any leakage of air between the flange 18 and the friction element 19 in the region of the passageways 39 and 40 is prevented by a packing ring 42 mounted in a suitable recess in said friction element.

The housing plate 6 includes a thickened annular portion 43 of the same inner and outer diametrical dimensions as the annular plate 4 and said annular portion provides a friction surface 44 spaced from but confronting the friction surface 34 of the annular plate 4. The inner face of the ring 5 and the friction surfaces 34 and 44 define a space of a radial depth greater than half that of the friction elements 19 and 20, whereby the outer portions of said friction elements are disposed in overlapping relation with said friction surfaces.

The friction elements or discs 19 and 20 have sufficient inherent resilience or elasticity to normally assume a position in which clearance exists between them and the plates 4 and 6, as indicated in Fig. 1. Upon the introduction of air under pressure into the chamber 24 under the control of a valve (not shown), the air acts in a manner seeking to move the friction elements 19 and 20 apart. Thus, the friction element 19 is flexed toward plate 4 so that the outer side 21 thereof engages the friction surface 34 of said plate, and the friction element 20 is simultaneously flexed toward the plate 6 so that the outer side 26 of the friction element 20 engages the friction surface 44 of the plate 6. In other words, the friction elements 19 and 20 are flexed substantially equal amounts in opposite directions and in a manner such that they flatly engage the plates 4 and 6 for the full extent of their overlap. Upon engagement of the friction elements 19 and 20 with the plates 4 and 6, as aforedescribed, driving torque will be transmitted between the sprocket 9 and the shaft 2, with either the shaft 2 or the sprocket 9 functioning as a driver when the device is used as a clutch. When the device is used as a brake, and if the shaft 2 is held stationary, relative rotation of the sprocket 9 will be opposed through the coaction of the housing 3 and the friction elements 19 and 20.

Upon operation of the air control valve (not shown) to effect the exhaust of air from the chamber 24, the flexible friction elements 19 and 20 inherently assume their original positions spaced from the plates 4 and 6, so that the housing 3 is then free of said friction elements.

Figure 2:
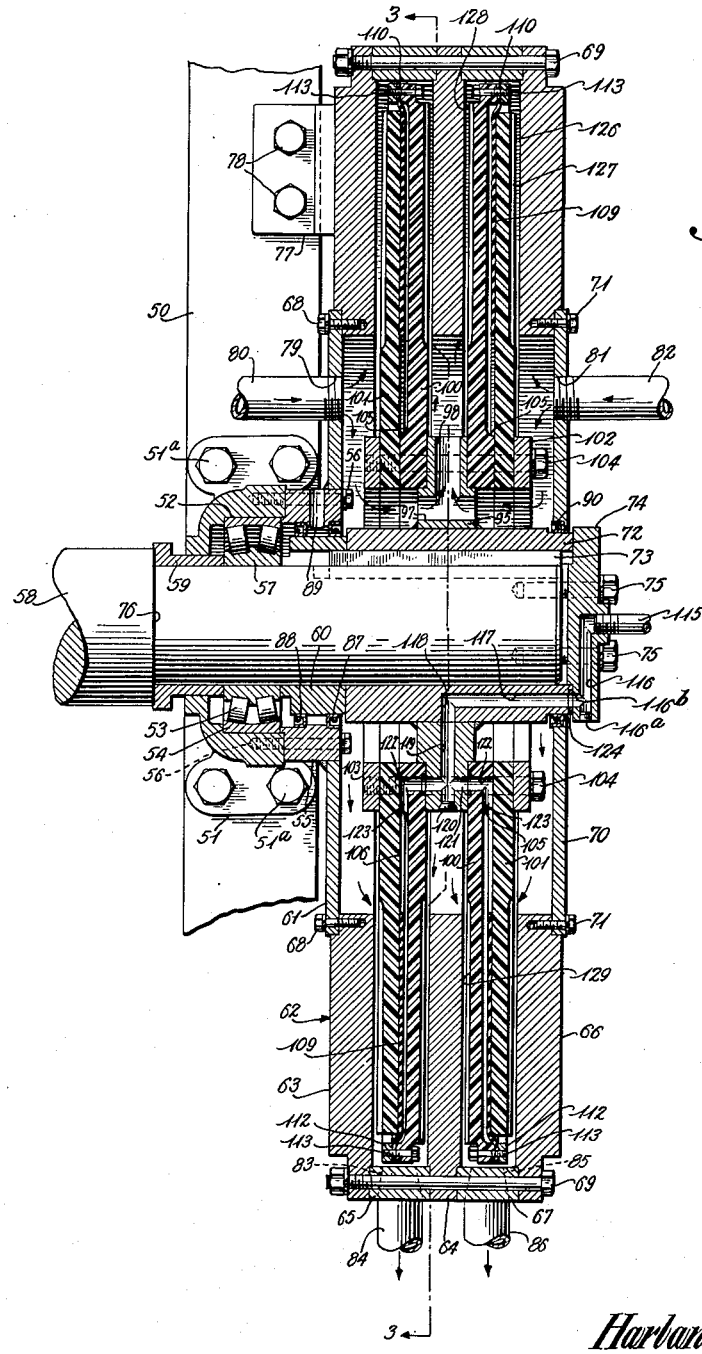
Fig. 2 is a longitudinal sectional view through a multi-disc water-cooled brake taken on the line 2—2 of Fig. 3 and embodying flexible friction elements or discs of the general character shown in Fig. 1, but provided with coolant grooves, the friction discs being shown in their disengaged position.

Referring now to Fig. 2, the numeral 50 identifies a frame member which has a bracket 51 mounted thereon by cap screws 51ª. The bracket 51 is counterbored at 52 to receive a roller bearing 53. The outer race 54 of the roller bearing is held in the bracket 51 by a mounting ring 55 secured to the bracket 51 by cap screws 56. The inner race 57 of the roller bearing 53 is mounted upon a driven shaft 58 between spacers 59 and 60, the spacer 60 lying coaxially within the ring 55.

An annular disc 61 is preferably welded at its inner edge to the ring 55, as best indicated at 61ª in Figs. 4 and 5, and constitutes one element of a brake housing generally identified by the numeral 62. The housing 62 further comprises an annular end plate 63 and an annular intermediate plate 64, the plates being separated at their outer edges by a spacer ring 65, and an annular end plate 66, which is separated from the plate 64 by a spacer ring 67. The annular disc 61 is secured to the annular plate 63 by a series of cap screws 68, and the annular plates 63, 64 and 66 and the spacer rings 65 and 67 are secured together in assembled relation by a series of bolts 69. The annular plate 66 has a disc 70, somewhat similar to the disc 61, secured thereto by a series of cap screws 71.

A mounting member 72 surrounds the shaft 58 and is secured thereto by conventional keys 73. One end of the mounting member 72 engages the spacer 60 and its opposite end is engaged by a clamping plate 74 which is secured to the end of the shaft 58 by a series of cap screws 75. The spacer 59 engages a shoulder 76 on the shaft 58 so that as the cap screws 75 are drawn up tightly, the spacer 59, the inner race 57 of the roller bearing 53, the spacer 60, and the mounting member 72 are all tightly clamped between the shoulder 76 and the clamping plate 74.

The housing 62 is prevented from rotating relative to the shaft 58 by a bracket 77 which is welded or otherwise secured to the annular plate 63, the bracket 77 being detachably fastened to the frame member 50 by cap screws 78.

The disc 61 is provided with a threaded opening 79 into which one end of a water supply pipe 80 is threaded. The disc 70 is provided with a similar opening 81 in which one end of a second water supply pipe 82 is threaded. The spacer ring 65 is provided with a threaded opening 83 in which one end of a discharge pipe 84 is mounted. The spacer ring 67 is provided with a similar opening 85 for the reception of a second discharge or drain pipe 86. Leakage of water from the housing 63 in the region between the mounting ring 55 and the spacer 60 is prevented by packing rings 87 and 88, the latter preventing any liquid which might leak past the ring 87 from gaining access to the roller bearing 53. The space between the packing rings 87 and 88 is vented to the atmosphere through a drain port 89 formed in the lower portion of the mounting ring 55, but diagrammatically illustrated in a horizontal plane in Fig. 2. On the other hand, leakage between the disc 70 and the mounting member 72 is prevented by a packing ring 90.

Figure 3:
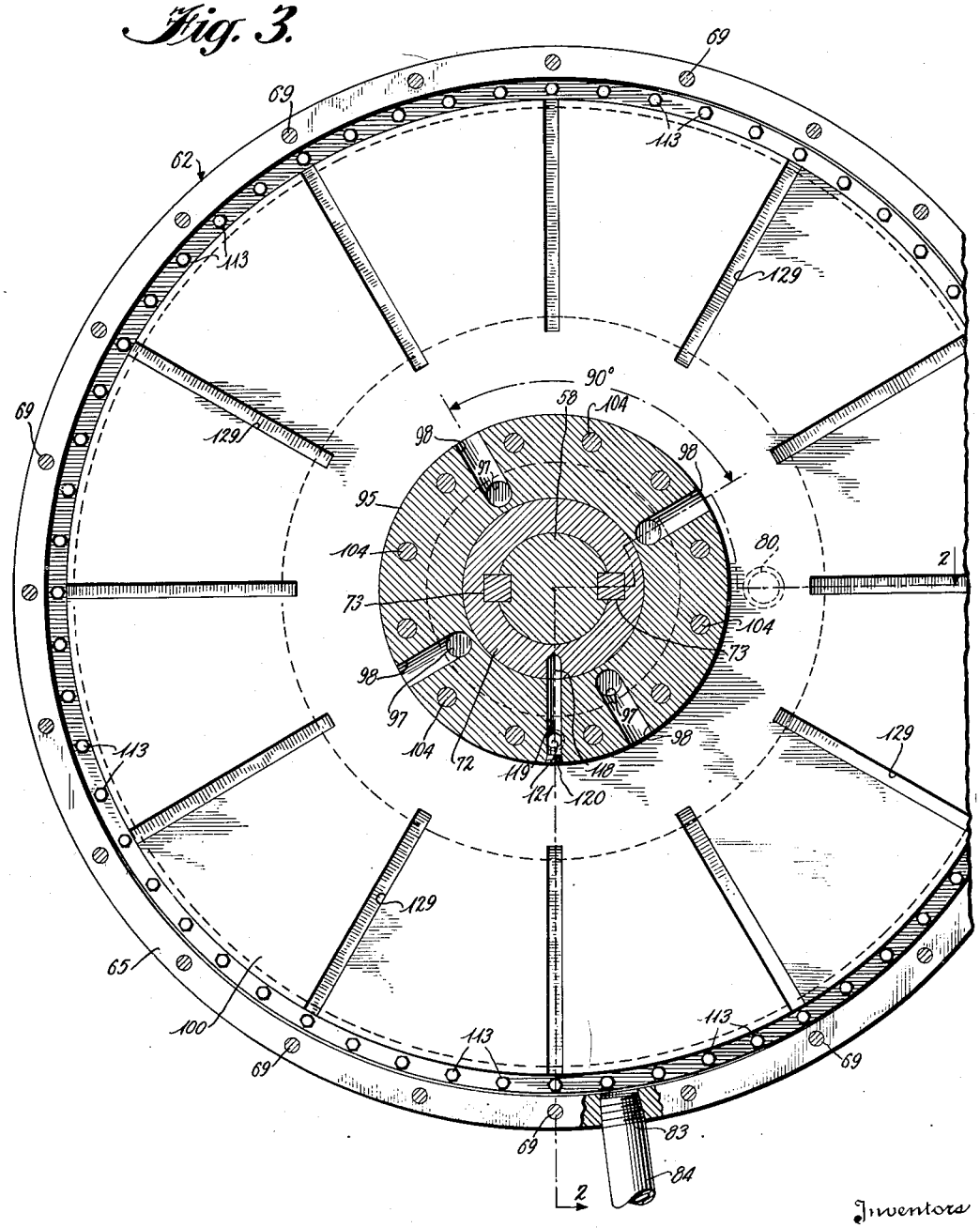
Fig. 3 is a transverse sectional view through the water-cooled brake taken on the line 3—3 of Fig. 2 and particularly illustrating the means employed for distributing the coolant for flow between the sets or pairs of friction discs and through the grooves in the discs, and the means for introducing operating fluid into the pressure chamber between each pair of friction discs.

The mounting member 72 has a coolant distributing member 95 fixedly mounted thereon by any suitable means, such as welding, indicated at 96 in Fig. 4. The coolant distributing member 95 is provided with four angularly spaced transverse passageways 97 extending therethrough, and with a radial passageway 98 communicating with each of the transverse passageways, the passageways 98 being located upon radii spaced 90° apart, as indicated in Fig. 3. It will be understood, however, that the number and arrangement of the transverse passageways 97 and the radial passageways 98 may be varied as desired.

The coolant distributing member 95 is provided with shoulders 99 on the opposite sides thereof which respectively form seats for a flexible friction element or disc 100 formed of the same material as the friction elements 18 and 19. Another friction element or disc 101 is arranged in confronting relation to each of the friction elements 100. The friction elements 100 and 101 comprise two pairs or sets of discs separated by the coolant distributing member 95. A clamping ring 102 is disposed outwardly of one of the friction elements 101 and another clamping ring 103 is disposed outwardly of the other of the friction elements 101. A plurality of cap screws 104 extend through suitable aligned openings in the clamping ring 102, the friction elements 100 and 101, the coolant distributing member 95, and into threaded openings in the clamping ring 103, in order to clamp the inner margins of the friction elements 100 and 101 together and to securely mount said friction elements upon the coolant distributing member 95.

The friction elements 100 are each provided with a boss 105 (similar to the boss 22) to form a space 106 between the inner face 107 of the friction elements 100 and the inner face 108 of the friction elements 101. A normally flat, annular, fabric-reinforced rubber diaphragm 109 is cemented or otherwise suitably secured to the inner face 108 of each of the friction elements 101. The friction elements 100 are larger in diameter than the friction elements 101, and the diaphragms 109 have an outside diameter equal to that of the friction elements 101 so that a marginal portion 110 of said diaphragms projects radially beyond the periphery of the friction elements 101. One side of the marginal portions 110 of the diaphragms 109 engages a marginal flange or ridge 111 on the friction elements 100 and the other side of the marginal portions 110 is engaged by clamping rings 112. A plurality of cap screws 113 extend through each of the flanges 111, the diaphragm portions 110 and the clamping rings 112 to secure said marginal portions of said diaphragms to the friction elements 100. The diaphragms 109 thus cooperate with the friction elements 100 and 101 to convert each of the spaces 106 into a chamber adapted to receive operating fluid under pressure. The outer marginal corner of the friction elements 100 is preferably cut away to provide ample clearance between the heads of the cap screws 113 and the annular plate 64, as is well illustrated in Fig. 4.

The clamping plate 74 (Fig. 2) has one end of an air supply conduit 115 mounted therein axially thereof and communicating with the inner end of a radial passageway 116. The outer end of the passageway 116 is closed by a plug 116a. The passageway 116 has a branch 116b which communicates with one end of a longitudinally extending passageway 117 formed in the mounting member 72, the other end of the passageway 117 communicating with a radial passageway 118 in said mounting member. The passageway 118 communicates with a radial passageway 119 in the coolant distributing member 95, the outer end of the passageway 119 being closed by a conventional plug 120. The passageway 119 is intersected inwardly of the plug 120 by a transverse passageway 121 which communicates with a passageway 122 formed in each of the friction elements 100. The boss portion 105 of each of the friction elements 100 is provided with a radial groove 123 which establishes communication between the passageway 122 and the pressure chamber 106 between each pair of friction elements 100 and 101. Air leakage between the clamping plate 74 and the mounting member 72 is prevented by a packing ring 124, and air leakage between the coolant distributing member 95 and the friction elements 100 is prevented by similar packing rings 125.

Each of the friction elements 101 has an outer face 126 provided with a plurality of radially extending grooves or passageways 127, and each of the friction elements 100 has an outer face 128 provided with a plurality of similar grooves or passageways 129. Fig. 3 shows the friction element 100 as being provided with twelve radial grooves 129, but it will be understood that the number of grooves may be varied as desired to effect adequate cooling. The grooves 127 extend from a point inwardly of the friction surfaces 63ª and 66ª on the plates 63 and 66, respectively, to the periphery of the friction elements 101, and the grooves 129 similarly extend outwardly in the friction elements 100 from a point inwardly of the inner edge of the intermediate wall 64 and the friction surfaces 64ª and 64ᵇ on the opposite sides thereof.

In Figs. 2, 4 and 5, two sets of friction elements 100—101 have been illustrated, but here again the number of sets can be varied to meet specific operating requirements. Also, in Fig. 2, the friction elements 100 and 101 have been illustrated in their inactive or disengaged positions, whereas in Figs. 4 and 5 they have been illustrated in their active or engaged positions.

It will be understood that the supply and exhaust of operating fluid to the chambers 106 will be controlled by a valve (not shown). When such valve is opened, air under pressure will be admitted into the pressure chambers 106 between the friction elements 100 and 101 by flow through the various passageways as indicated by the dotted arrows in Fig. 5. The action of the operating fluid is such as to cause the friction elements 100 and 101 to flex substantially equal amounts in opposite directions, so that one set of the friction elements 100—101 engage with the adjacent friction surfaces 64ª and 63ª of the annular plates 64 and 63, respectively, and the other set of friction elements 100—101 engage with the adjacent friction surfaces 64ᵇ and 66ª of the annular plates 64 and 66, respectively, to effectively resist rotation of the shaft 58 with respect to the brake housing 62.

When the brake is in operation, cooling water is introduced into the brake housing 62 through the water supply pipes 80 and 82, and it fills and circulates through the housing 62 in the manner indicated by the solid arrows in Figs. 4 and 5. Thus, a portion of the water introduced into the brake housing 62 will flow outwardly through the grooves 127 in the friction elements 101 in direct contact with the inner faces 63ª and 65ª of the annular end plates 63 and 65 to effectively cool the same. Other portions of the water will enter the transverse pasageways 97 in the coolant distributing member 95 and then flow radially outwardly through the passageways 98 into the space between the friction elements 100 and, thence, radially outwardly through the grooves 129 in direct contact with the opposite faces 64ª and 64ᵇ of the intermediate plate 64 to effectively cool the same. The water, during its passage through the grooves 127—129, becomes more or less heated and is eventually discharged through the pipes 84 and 86. Thus, a continuous circulation of the cooling medium takes place through the brake housing, and the brake is prevented from overheating. In order to disengage the friction elements 100 and 101, it is only necessary to vent the pipe 115 to the atmosphere to release the air pressure from the pressure chambers 106 and enable the inherent elasticity of the friction elements 100 and 101 to restore said friction elements to their initial disengaged positions.

While preferred embodiments of the present clutch and brake structure have been illustrated herein, it will be understood that changes in the arrangement and details of construction thereof may be made without departing from the spirit of the invention or the scope of the annexed claims.

We claim:

1. A device of the character described, comprising: a housing having friction surfaces therein arranged in spaced confronting relation; a pair of flexible friction discs; means securing the central portions of said friction discs together, said friction discs having outer portions extending into the space between the friction surfaces of said housing; a substantially flat annular diaphragm between said friction discs having different concentric annular portions thereof of different diameters secured directly to the respective friction discs to provide a pressure chamber between said friction discs; and means for admitting operating fluid under pressure into said pressure chamber to flex the outer portions of said friction discs apart and into engagement with said friction surfaces of said housing.

2. A device of the character described, comprising: spaced plates having annular friction surfaces arranged in confronting relation; a pair of flexible friction discs having outer portions extending into the space between the friction surfaces of said plates; means at the inner portions of said friction discs spacing the major area of the adjacent faces of said friction discs apart to provide a space therebetween; means securing the inner portions of said friction discs against separation; a substantially flat, annular diaphragm disposed in the space between said friction discs, said diaphragm having different concentric annular portions thereof of different diameters secured directly to the adjacent faces of each of the friction discs to convert said space into a pressure chamber; and means for admitting operating fluid under pressure into said pressure chamber to flex the outer portions of said friction discs apart and into engagement with said friction surfaces of said plates.

3. A device of the character described, comprising: a housing having friction surfaces therein arranged in spaced confronting relation; a pair of flexible friction discs; a mounting member; means securing said friction discs to said mounting member, said friction discs having outer portions extending into the space between the friction surfaces of said housing; a substantially flat, annular diaphragm between said friction discs and having an inner annular portion secured directly to the inner surface of one of said friction discs; means directly securing the outer marginal portion of said diaphragm to the other of said friction discs and providing a pressure chamber between said friction discs; and means for admitting operating fluid under pressure into said pressure chamber to flex the outer portions of said friction discs apart and into engagement with said friction surfaces of said housing.

4. A device of the character described, comprising: a housing having annular friction surfaces therein arranged in spaced confronting relation; a mounting member; a pair of flexible friction discs; means securing the inner portions of said friction discs to said mounting member, said friction discs having outer portions extending into the space between the annular friction surfaces of said housing; a substantially flat, annular diaphragm between said friction discs having different concentric portions thereof of different diameters secured directly to the respective friction discs to provide a pressure chamber between said friction discs; and means for admitting operating fluid under pressure into said pressure chamber to flex the outer portions of said friction discs apart and into engagement with said friction surfaces of said housing.

5. A device of the character described, comprising: a housing having friction surfaces therein arranged in spaced confronting relation; a pair of flexible friction elements; a mounting member; means securing said pair of friction elements to said mounting member, said friction elements having outer portions extending into the space between the friction surfaces of said housing, one of said friction elements being larger in diameter than the other; a substantially flat, annular diaphragm between said annular friction elements and having an annular portion cemented to the inner side of said smaller friction element; means including a clamping ring securing the outer marginal portion of said diaphragm to the larger of said friction elements in a region beyond the outer periphery of said smaller friction element; and means for admitting operating fluid under pressure into said pressure chamber to flex the outer portions of said friction discs apart and into engagement with said friction surfaces of said housing.

6. A device of the character described, comprising: a closed housing having annular friction surfaces therein arranged in spaced confronting relation; a mounting member; a pair of annular, non-metallic, flexible friction elements arranged side by side and secured only at their inner marginal portions to said mounting member, said friction elements having outer marginal edge portions extending into the space between the friction surfaces of said housing; means for flexing the outer marginal edge portions of said friction elements apart and into engagement with the friction surfaces of said housing, said friction elements having generally radially extending grooves in the outer sides thereof extending from a point inwardly of the annular friction surfaces of said housing to the outer periphery of said friction elements; means for introducing a coolant under line pressure into said housing; and means for draining the coolant from said housing.

7. A device of the character described, comprising: a closed housing having friction surfaces therein arranged in spaced confronting relation; a pair of flexible, non-metallic, friction discs; a mounting member; means securing said friction discs to said mounting member, said friction discs having outer portions extending into the space between the friction surfaces of said housing and provided with grooves in the outer sides thereof for the passage of a coolant therethrough when said friction discs are engaged with said friction surfaces; a diaphragm between said friction discs having an annular portion secured to the inner side of one of said friction discs; means securing another annular portion of said diaphragm of a different diameter than said first-mentioned annular portion to the inner side of the other of said friction discs; means for admitting operating fluid under pressure into said pressure chamber; means for admitting a coolant under line pressure into said housing; and means for draining the coolant from said housing.

8. A device of the character described, comprising: a housing having friction surfaces therein arranged in spaced confronting relation; a shaft; a mounting member keyed on said shaft; a pair of annular flexible friction elements secured to said mounting member, said friction elements having outer portions extending into the space between the friction surfaces of said housing; a single annular diaphragm disposed between said friction elements and having the inner marginal area thereof secured to one of said friction elements and having the outer marginal area thereof secured to the other of said friction elements to provide a pressure chamber between said friction elements, said shaft and mounting member, and at least one of said friction elements having passage means communicating with said pressure chamber for introducing operating fluid under pressure into said pressure chamber.

9. A device of the character described, comprising: a housing having annular friction surfaces therein arranged in spaced confronting relation; a mounting member, said mounting member having a cylindrical portion and a radial flange at one end of said cylindrical portion; a pair of annular flexible friction elements mounted side by side upon said cylindrical portion of said mounting member; means securing the inner marginal portions of said friction elements to the flange of said mounting member, one of said friction elements being thickened at the inner marginal portion thereof to space the remainder thereof from the other friction element; and an annular diaphragm disposed in said last-mentioned space and having the outer marginal area thereof secured to one of said friction elements and the inner marginal area thereof secured to the other of said friction elements, whereby to convert said space into a chamber adapted to receive operating fluid under pressure, at least one of said friction elements having a passage formed therein communicating with said chamber for admitting operating fluid under pressure into said pressure chamber.

10. A device of the character described, comprising: a pair of plates separated by a spacer ring and means securing the plates and spacer ring in assembled relation, said plates having annular friction surfaces arranged in spaced confronting relation; a mounting member arranged concentric with the friction surfaces of said plates, said mounting member having an external cylindrical portion and a radial flange at one end of said cylindrical portion; a pair of annular flexible friction elements disposed in side by side relation upon said cylindrical portion of said mounting member, the inner marginal portion of one of said friction elements being thicker than the remainder thereof in order to provide a space between said friction elements, the outer side of one of said friction elements engaging one side of said radial flange; a clamping ring engaging the outer side of the other of said friction elements; a plurality of cap screws extending through said flange and friction elements and being threaded into said clamping ring for securing said friction elements upon said mounting member, said friction elements including outer portions extending into the space between said plates; a diaphragm disposed in the space between said friction elements, said diaphragm having the outer marginal portion thereof secured to one of said friction elements and having an annular region inwardly of its outer margin secured to the other of said friction elements, whereby to convert the space between said friction elements into a chamber adapted to receive operating fluid under pressure; and means for introducing operating fluid under pressure into said chamber to flex the outer portions of said friction elements apart and into engagement with the annular friction surfaces of said plates.

11. A water-cooled structure, comprising: a substantially cylindrical housing including spaced end walls, each of which is provided with an annular friction surface, and an intermediate wall having an annular friction surface on the opposite sides thereof; a mounting member adapted to be secured to a shaft; a coolant distributing member carried by said mounting member; two pairs of flexible friction discs arranged in axially spaced relation relative to said coolant distributing member; means securing the inner marginal portions of said pairs of friction discs to said coolant distributing member, said coolant distributing member having passage means communicating with the space between said pairs of friction discs, each of said pairs of friction discs having portions extending into the space between one of said end walls of said housing and said intermediate wall, the outer sides of all of said friction discs having generally radial passageways formed therein, said radial passageways extending from a point inwardly of the annular friction surfaces on said end walls and from a point inwardly of the inner margin of said intermediate wall, to the outer periphery of said friction discs; means for flexing the outer portions of each pair of friction discs apart and into engagement with the end walls and intermediate wall of said housing; means for introducing a cooling medium into said housing for flow through the passage means in said coolant distributing member and through the grooves in all of said friction discs; and means for discharging the cooling medium from said housing.

12. A water-cooled structure, comprising: a substantially cylindrical housing including end walls, each of which is provided with an annular friction surface; an annular plate of substantially the same radial depth as said friction surfaces disposed between said end walls; a spacer between each of said end walls and said annular plate; means securing said end walls, spacer and annular plate in assembled relation; a mounting member adapted to be secured to a shaft; a coolant distributing member on said mounting member; a pair of annular flexible friction elements arranged upon each side of said coolant distributing member; means securing said pairs of friction elements to said coolant distributing member, said coolant distributing member having a plurality of transverse passageways in the region thereof between said mounting member and the inner edges of said pairs of friction elements and also having radial passageways extending outwardly from said transverse passageways into the space between said pairs of friction elements, each of said pairs of friction elements having outer portions extending into the space between one of said end walls of said housing and said annular plate, the outer sides of all of said friction elements having generally radial passageways formed therein, said passageways extending from a point inwardly of the annular friction surfaces on said end walls and from a point inwardly of the inner edge of said annular plate, to the outer periphery of said friction elements; means for flexing the outer portion of each pair of friction elements apart and into engagement with the end walls and annular plate of said housing; means for introducing a cooling medium into said housing for flow through the passageways in said coolant distributing member and through the grooves in all of said friction elements; and means for discharging the cooling medium from said housing.

13. A water-cooled brake structure, comprising: a substantially cylindrical housing including end walls, each of which is provided with an annular friction surface; an annular plate of substantially the same radial depth as said friction surfaces disposed between said end walls; a spacer between each of said end walls and said annular plate; means securing said end walls, spacers and annular plate in assembled relation; a shaft arranged axially of said cylindrical housing; a frame member; a bracket on said frame member supporting said shaft for rotation relative to said housing; means restraining said housing from rotating relative to said frame member; a mounting member keyed to said shaft; a coolant distributing member on said mounting member; a pair of annular flexible friction elements arranged upon each side of said coolant distributing member; means securing said pairs of friction elements to said coolant distributing member, said coolant distributing member having a plurality of transverse passageways extending therethrough in the region thereof between said mounting member and the inner edges of said pairs of friction elements and also having radial passageways extending outwardly from said transverse passageways into the space between said pairs of friction elements, each of said pairs of friction elements having portions extending into the space between one of said end walls of said housing and said annular plate, the outer sides of all of said friction elements having generally radial passageways formed therein, said passageways extending from a point inwardly of the annular friction surfaces on said end walls and from a point inwardly of the inner edge of said annular plate, to the outer periphery of said friction elements; an annular diaphragm disposed between the friction elements of each pair of friction elements, each annular diaphragm having the outer margin thereof secured to one of its associated friction elements and having the inner margin thereof secured to the other of its associated friction elements and providing a pressure chamber between each pair of friction elements, said coolant distributing member having air passage means formed therein for operating fluid under pressure, and at least one of the friction elements of each of said pairs of friction elements having passage means establishing communication between the air passage means of said coolant distributing member and the pressure chamber between the respective pairs of friction elements; means for introducing a cooling medium into said housing for flow through the passageways in said coolant distributing member and through the grooves in all of said friction elements; and means for discharging the cooling medium from said housing.

14. A friction plate assembly, comprising: a pair of annular flexible friction elements; means at the inner margins of said friction elements spacing said friction elements apart; means securing said friction elements together at said inner margins; a substantially flat, annular diaphragm in the space between said friction discs having one annular marginal area at one side face thereof secured directly to the inner surface of one of said friction discs and having the other marginal area at the opposite side face thereof secured directly to the other of said friction discs and providing a pressure chamber between said friction discs; and means for admitting operating fluid under pressure into said pressure chamber to flex the outer portions of said friction discs apart.

15. A friction plate assembly, comprising: a pair of flexible friction discs; a mounting member; means securing the inner portions of said friction discs to said mounting member; a substantially flat, annular diaphragm between said friction discs having an annular area at the inner margin thereof secured directly to the inner surface of one of said friction discs and having the outer marginal portion thereof secured directly to the other of said friction discs and providing a pressure chamber between said friction discs; and means for admitting operating fluid under pressure into said pressure chamber to flex the outer portions of said friction discs apart.

16. A friction plate assembly, comprising: a pair of flexible friction discs; a mounting member; means securing said friction discs to said mounting member in spaced relation, one of said friction discs being larger in diameter than the other; an annular diaphragm in the space between said friction discs having an inner annular area thereof cemented to the inner surface of the smaller of said friction discs; a clamping ring securing the outer marginal portion of said diaphragm to the larger of said friction discs in a region beyond the outer periphery of said smaller friction disc and providing a pressure chamber between said friction discs; and means for admitting operating fluid under pressure into said pressure chamber to flex the outer portions of said friction discs apart.

HARLAND W. CARDWELL.
EARL R. JOHNSON.

REFERENCES CITED

The following references are of record in the file of this patent:

UNITED STATES PATENTS

| Number | Name | Date |
|---|---|---|
| 427,085 | Jones | May 6, 1890 |
| 848,379 | Lake | Mar. 26, 1907 |
| 1,612,345 | Aspinwall | Dec. 28, 1926 |
| 2,106,472 | Aikman | Jan. 25, 1938 |
| 2,181,988 | Davis | Dec. 5, 1939 |
| 2,267,263 | Berger et al. | Dec. 23, 1941 |
| 2,370,360 | McLean et al. | Feb. 27, 1945 |
| 2,381,941 | Wellman et al. | Aug. 14, 1945 |
| 2,439,849 | Fawick | Apr. 20, 1948 |

FOREIGN PATENTS

| Number | Country | Date |
|---|---|---|
| 1,335 | Great Britain | Jan. 23, 1892 |
| 294,814 | Great Britain | Aug. 2, 1928 |
| 372,825 | France | Apr. 19, 1907 |
| 232,144 | Germany | Mar. 17, 1911 |
| 243,557 | Germany | Feb. 16, 1912 |